United States Patent [19]
Yoon

[11] 3,806,976
[45] Apr. 30, 1974

[54] DOCK PLATE
[75] Inventor: Young Z. Yoon, Des Moines, Iowa
[73] Assignee: Woodford Manufacturing Company, Des Moines, Iowa
[22] Filed: Mar. 17, 1972
[21] Appl. No.: 235,589

[52] U.S. Cl. .................................... 14/71, 14/72
[51] Int. Cl. .......................................... B65g 11/00
[58] Field of Search ................................. 14/71, 72

[56] References Cited
UNITED STATES PATENTS

| | | | |
|---|---|---|---|
| 3,486,181 | 12/1969 | Hecker | 14/71 |
| 3,426,377 | 2/1969 | Beckwith | 14/71 |
| 2,974,336 | 3/1961 | Kelley | 14/71 |
| 3,636,578 | 1/1972 | Dieter | 14/71 |
| 3,440,673 | 4/1969 | Kelley | 14/71 |

Primary Examiner—Nile C. Byers, Jr.
Attorney, Agent, or Firm—Zarley, McKee & Thomte

[57] ABSTRACT

A dock plate structure for bridging or spanning the space between a loading dock and a truck or railway car is disclosed herein. First and second spaced apart support arms are positioned adjacent the vertical face of the loading dock and are vertically movable between a lowered position to a raised position with respect to the upper surface of the dock. First and second plate members are pivotally secured together and are pivotally secured to the upper ends of the support arms by linkage means. The plate members are pivotally movable from a stored position adjacent the vertical face of the dock to an operative position to span or bridge the space between the dock and the carrier vehicle. The plate members are vertically disposed and horizontally spaced when in their stored position. A counterweight means is operatively secured to the vertically movable support arms to permit the structure to be easily raised upwardly above the upper surface of the dock to permit the plate members to be unfilded from the superposed relationship to the operative position. The structure is then lowered to permit the plate members to engage and rest upon the dock and the carrier vehicle to span the space therebetween.

8 Claims, 7 Drawing Figures

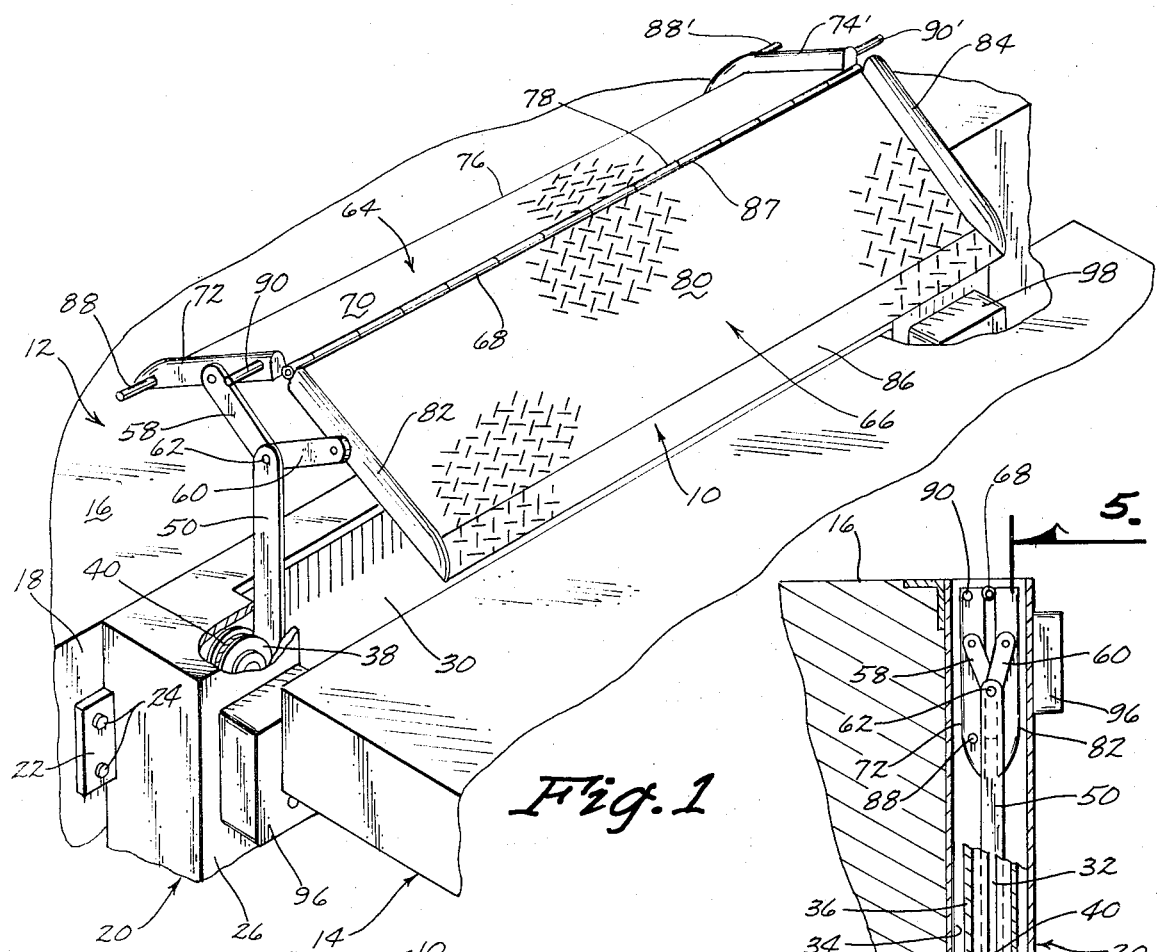
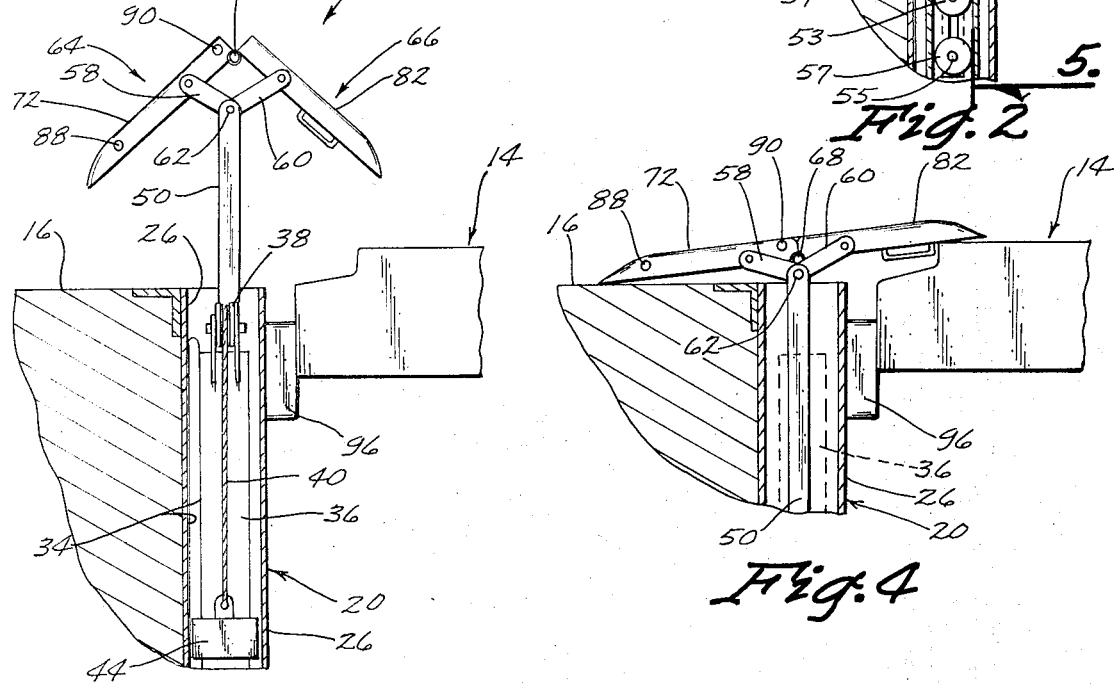

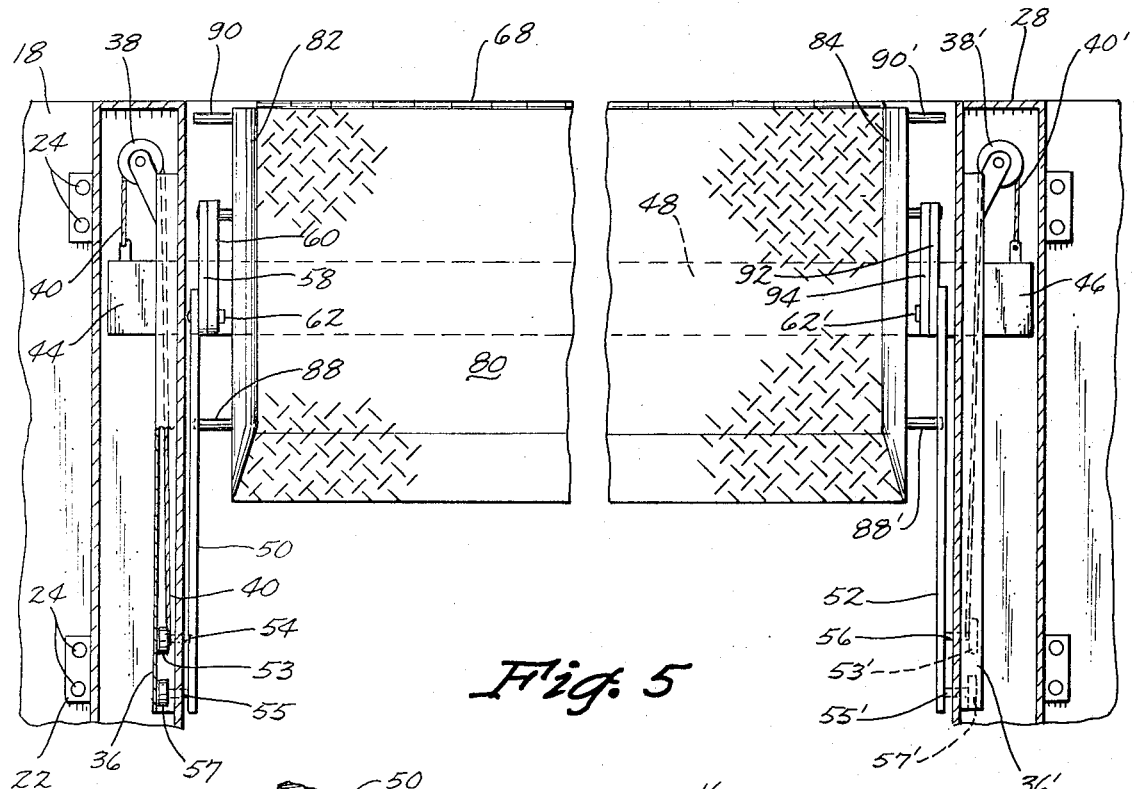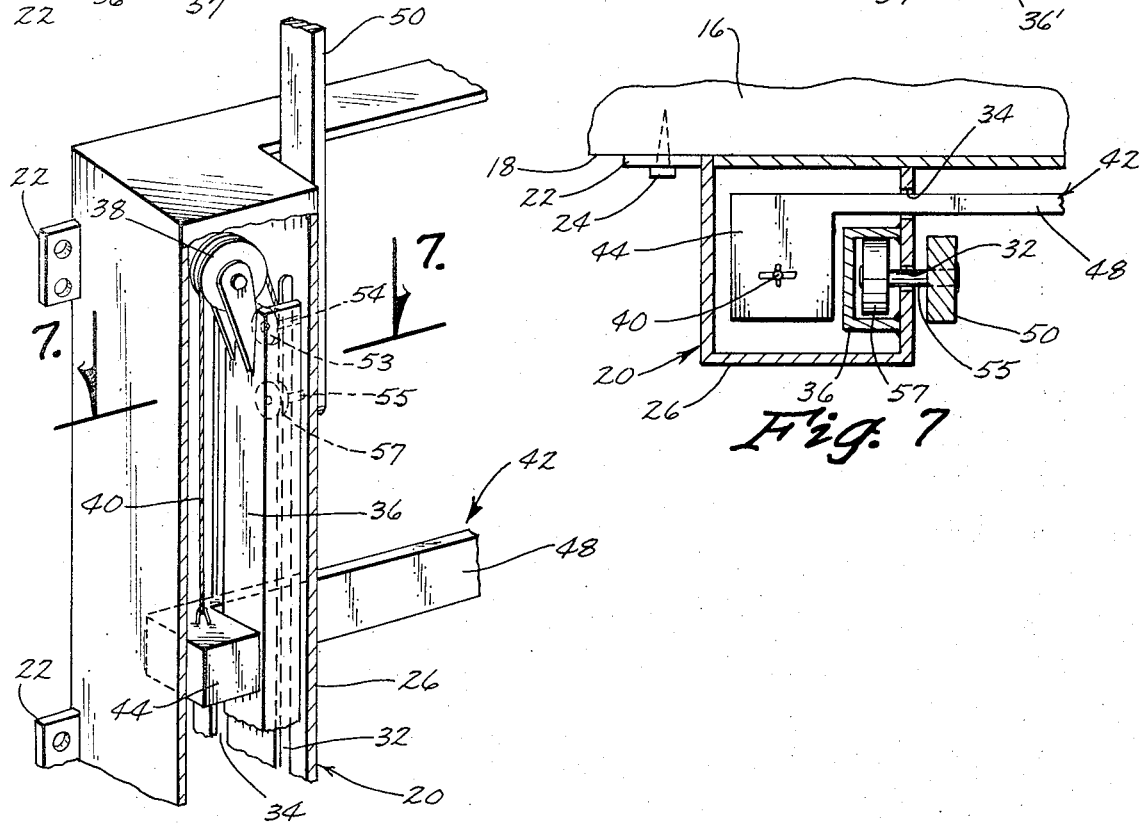

DOCK PLATE

Dock plates are commonly employed to bridge or span the space between a loading dock and a carrier vehicle such as a truck or a railway car. The dock plates are quite heavy since "fork-lifts" are ordinarily driven thereover and the structure must be sufficiently strong to withstand such loads. Attempts have been previously made to permanently mount the dock plates on the loading dock in an effort to provide a means for quickly moving the dock plates into position. A further consideration in such installations is that the dock plates must be stored in such a position when not being used so as not to interfere with normal loading dock operations. One such device is disclosed in U.S. Pat. No. 3,596,303 wherein a dock plate is pivotally secured to the vertical face of a loading dock. The device of said patent has a serious disadvantage in that the length of the dock plate is limited since it cannot exceed the height of the vertical face of the loading dock. The unitary plate structure of said patent also requires that the plate structure be raised a considerable distance with respect to the dock structure since the lower end of the dock plate must clear the carrier vehicle as the dock plate is being moved into position.

Therefore, it is a principal object of this invention to provide an improved dock plate structure.

A further object of this invention is to provide a dock plate including a pair of plate members which are pivotally connected together to enable the plate members to be stored in a folded vertically disposed condition adjacent the vertical face of the dock.

A further object of this invention is to provide a dock plate structure which may be moved from its stored and operative positions and vice versa with a minimum of effort.

A further object of this invention is to provide a dock plate which will not move out of position during the use thereof.

A further object of this invention is to provide a dock plate having means thereon to protect it from the carrier vehicle.

A further object of this invention is to provide a dock plate which is economical of manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the dock plate of this invention in one of its positions of movement.

FIG. 2 is a side view of the dock plate illustrating the dock plate in its stored position.

FIG. 3 is a view similar to FIG. 2 except that the dock plate is shown in its uppermost position.

FIG. 4 is a view similar to FIGS. 2 and 3 except that the dock plate is shown to be positioned in its operative position.

FIG. 5 is a sectional view seen along lines 5—5 of FIG. 2.

FIG. 6 is a partial perspective view illustrating the manner in which one of the support arms is secured to a counterweight.

FIG. 7 is a sectional view seen along lines 7—7 of FIG. 6.

The dock plate of this invention is referred to generally by the reference numeral 10 while the reference numerals 12 and 14 refer to a loading dock and a carrier vehicle respectively. The carrier vehicle in the drawings is a truck but it should be understood that the carrier vehicle could also be a railway car. The dock 12 includes an upper surface 16 and a vertical face 18.

Dock plate 10 includes a housing 20 which is secured to the vertical face 18 by anchor plates 22 and bolts 24. Housing 20 includes end portions 26 and 28 which extend outwardly from intermediate portion 30. End portion 26 is provided with a vertical slot 32 formed therein as illustrated in FIG. 6. End portion 26 is also provided with a vertical slot 34 as also seen in FIG. 6. A channel shaped guide means 36 is provided in the interior of the end portion 26 in the manner illustrated in FIG. 7.

Pulley 38 is rotatably mounted on the upper end of the guide means 36 by any convenient means and has a cable 40 extending thereover. One end of cable 40 is secured to a counterweight 42 having end portions 44 and 46 and intermediate portion 48. As seen in FIG. 7, end portion 44 of counterweight 42 is positioned in the end portion 26 with the intermediate portion 48 being received or extending through the slot 34.

A guide means 36' is positioned in the end portion 28 and has a pulley 38' rotatably mounted thereon. Cable 40' extends over the pulley 38' and is connected to the end portion 46 of the counterweight 42. The end portion 28 has vertically disposed slots formed therein identical to the slots 32 and 34.

The numerals 50 and 52 refer to support arms having guide pins 54 and 56 extending outwardly therefrom above the lower ends thereof respectively. Guide pin 54 extends through the slot 32 and is secured to one end of the cable 40 within guide means 36. A roller 53 is provided on the end of the guide pin 54. The guide pin 56 extends through the slot 32' in end portion 28 and is secured to the other end of the cable 40' within guide means 36'. Roller 53' is provided on the end of pin 56.

Guide pin 55 extends outwardly from support arm 50 below guide pin 54. Guide pin 55 extends through the slot 32 and has a roller 57 provided thereon which rolls upon the inner surface of guide means 36. Guide pin 55' extends outwardly from support arm 52 below guide pin 54'. Guide pin 55' extends through the slot 32' and has a roller 57' provided thereon which rolls upon the inner surface of the guide means 36'.

Linkages 58 and 60 are pivotally connected at one end thereof to the upper end of the support arm 50 by pin 62. The other ends of the linkages 58 and 60 are pivotally secured to plate members 64 and 66 respectively. Support arm 52 has a pair of linkages 92 and 94 pivotally secured to the upper end thereof which are pivotally secured to the plate members 64 and 66 in identical fashion to the linkages 58 and 60. The plate members 64 and 66 are pivotally or hingedly connected together by means of hinge 68. Plate member 64 includes a floor platform portion 70, opposite sides or ribs 72 and 74, approach portion 76 and end portion 78. Plate member 66 includes a floor platform portion 80, opposite sides or ribs 82 and 84, approach portion 86 and end portion 87. Plate member 64 has handles 88 and 90 extending laterally therefrom as illustrated in FIG. 1. Handle 88 is located near the approach portion 76 while the handle 90 is located near the end portion 78. Likewise, a pair of handles 88' and 90' are provided at the other end of the plate member 64. The linkages 58 and 60 are secured to the plate members outwardly from the inner ends thereof approximately one-fourth the length thereof. Bumpers 96 and 98 are provided on the end portions 26 and 28 of housing 20 as seen in FIG. 1 to prevent the vehicle 14 from damaging the dock plate structure.

The dock plate is ordinarily positioned in the stored condition seen in FIG. 2. In the stored condition of FIG. 2, the plate members 64 and 66 are in a superposed relationship at the vertical face 18 of the dock 12 when in its stored position. The vehicle 14 is backed or placed adjacent the dock plate structure as illustrated in FIG. 1 to facilitate the loading or unloading thereof. With the vehicle 14 positioned as illustrated in FIG. 1, the dock plate is then moved from the position of FIG. 2 to the position of FIG. 4 as will be explained in more detail hereinafter. The dock plate is initially raised from the position of FIG. 2 to the position of FIG. 1 by grasping one or both of the handles 90, 90' and pulling the dock plate upwardly to the position illustrated in FIG. 3. The counterweight 42 moves downwardly in the housing 20 as the dock plate is raised thereby permitting the dock plate to be easily raised due to the cable connection therebetween. The rollers 53, 57 and 53', 57' are provided on the support arms 50 and 52 respectively to maintain the arms 50 and 52 in a vertically disposed position.

When the dock plate has been raised above the upper surface 16, the plate members 64 and 66 are then pivotally moved with respect to each other from the superposed position to an aligned position. The dock plate is then lowered to the position of FIG. 4 to span the space between the vehicle 14 and the dock 12. The dock plate provides a very rigid surface for the fork lift or the like to pass thereover and will not advertently move out of position due to the construction thereof. The plate members pivot about pins 62 and 62' thereby compensating for differences in the heights of the dock 12 and vehicle 14.

When it is desired to move the dock plate into its stored position, it is simply necessary to grasp the handles 90 and 90' and move the dock plate upwardly until the plate members 64 and 66 can be folded back to the superposed position. The dock plate is then lowered into its stored position as seen in FIG. 2. The fact that the plate members 64 and 66 are in a folded vertically disposed position during their stored condition results in the dock plate occupying a minimum of vertical space and permits the dock plate to span considerable distances when unfolded. The fact that the plate members 64 and 66 are pivotally joined as shown in the drawings also substantially reduces the height to which the dock plate must be raised before it can be unfolded. In other words, the dock plate need only be raised above the loading dock a height equal to the length of one of the plate members 64 and 66.

Thus it can be seen that a unique dock plate has been provided which can be moved between stored and operative positions with a minimum of effort. The dock plate of this invention also is capable of spanning greater distances than conventional dock plate structures. Thus it can be seen that the dock plate of this invention accomplishes at least all of its stated objectives.

I claim:

1. A dock plate for use in spanning the space between a loading dock and a carrier vehicle, said dock having an upper surface and a vertical face, comprising, first and second spaced apart support arms operatively vertically movably secured to the vertical face of said dock, said arms having upper and lower ends, said support arms being movable from a lowered position to a raised position with respect to the upper surface of said dock, first and second plate members pivotally secured together and operatively pivotally secured to the upper ends of said arms, said plate members being pivotally movable from a stored position adjacent the vertical face of said dock to an operative position to span the space between said dock and said carrier vehicle, said plate members being vertically disposed and horizontally spaced with respect to each other when in said stored position.

2. The dock plate of claim 1 wherein the lower ends of said support arms are pivotally operatively secured about a horizontal axis to said vertical face of said dock.

3. The dock plate of claim 1 wherein a housing is secured to the vertical face of said dock, said housing comprising an intermediate portion having opposite end portions extending outwardly from said dock, each of said end portions having inner wall portions, said first and second support arms being positioned outwardly of said intermediate portion adjacent the inner wall portions of said end portions, said support arms being operatively vertically movable secured to said end portions.

4. The dock plate of claim 3 wherein a counterweight means is positioned in said housing, said support arms being operatively secured to said counter-weight means.

5. The dock plate of claim 3 wherein each of said inner wall portions have a vertical slot formed therein, a guide means in each of said end portions, each of said support arms having at least a pair of guide pins extending therefrom through the slot in the end portion adjacent thereto, and a roller means on each of said guide pins engaging the guide means in the end portion adjacent thereto to maintain said support arms in a substantially vertically disposed position.

6. A dock plate for use in spanning the space between a loading dock and a carrier vehicle, said dock having an upper surface and a vertical face, comprising, first and second spaced apart support arms operatively vertically movably secured to the vertical face of said dock, said arms having upper and lower ends, said support arms being movable from a lowered position to a raised position with respect to the upper surface of said dock, first and second plate members pivotally secured together and operatively pivotally secured to the upper ends of said arms, said plate members being pivotally movable from a stored position adjacent the vertical face of said dock to an operative position to span the space between said dock and said carrier vehicle, said plate members being vertically disposed and horizontally spaced with respect to each other when in said stored position, and a linkage means pivotally connecting each of said support arms to said plate members at opposite sides thereof.

7. The dock plate of claim 6 wherein each of said linkage means comprises a first elongated link pivotally connected at one end thereof to the upper end of the support arm and a second elongated link pivotally connected at one end thereof to the upper end of the support arm, said first and second links being pivotally connected at their other ends to said first and second plate members respectively.

8. The dock plate of claim 7 wherein each of said plate members has an inner end, an approach end and opposite sides, the inner ends of said plate members being pivotally connected together, said other ends of said first and second links being pivotally connected to one side of said first and second plate members approximately one-fourth the distance between the inner and approach ends of said plate members.

* * * * *